Nov. 12, 1963 G. S. WING ETAL 3,110,212
INSERT
Filed March 26, 1959 2 Sheets-Sheet 1
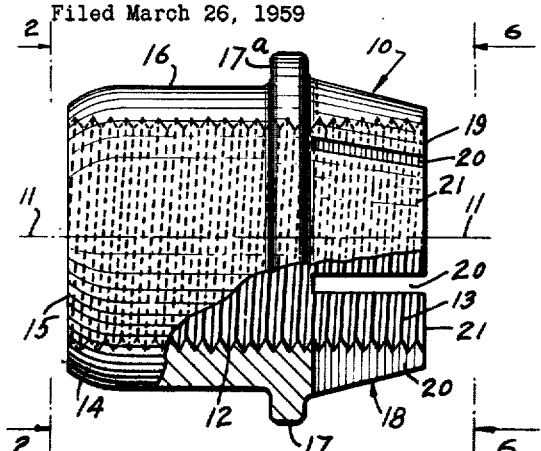
FIG. 1.
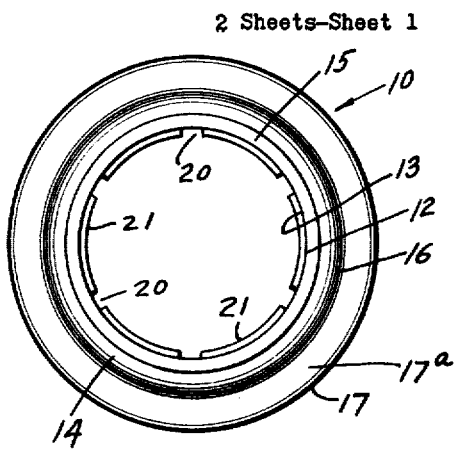
FIG. 2.
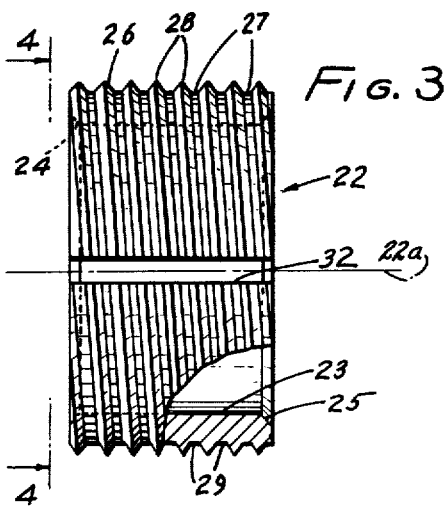
FIG. 3.
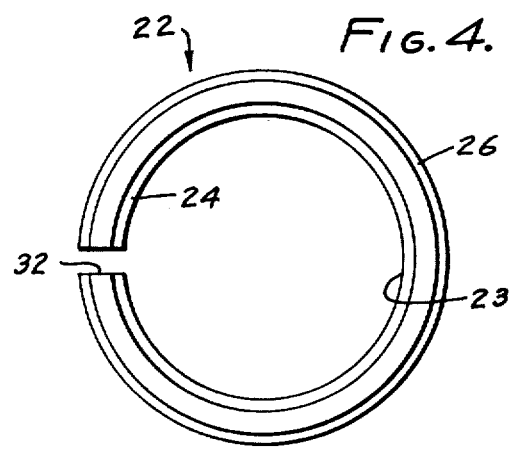
FIG. 4.
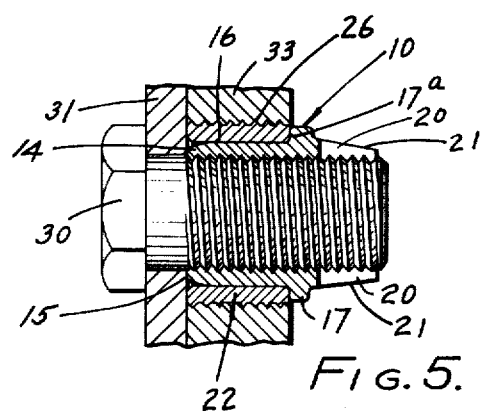
FIG. 5.
FIG. 6.
INVENTORS
GEORGE S. WING
WILLIAM R. DICKIE
BY
Angus & Mon
ATTORNEYS Nov. 12, 1963  G. S. WING ETAL  3,110,212
INSERT
Filed March 26, 1959  2 Sheets-Sheet 2
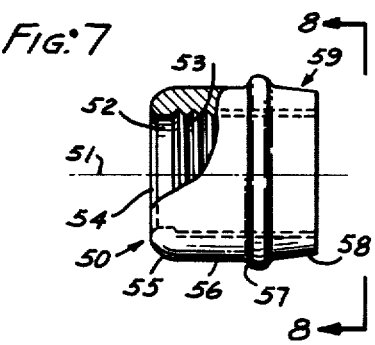
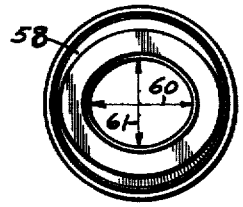
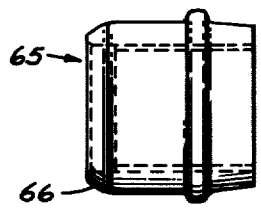
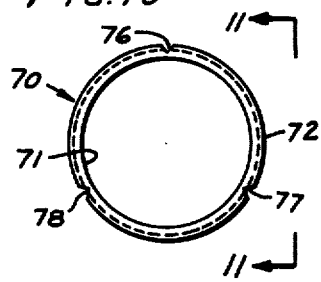
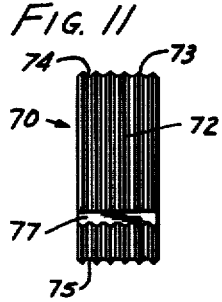
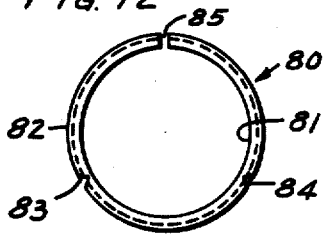
INVENTOR.
GEORGE S. WING
WILLIAM R. DICKIE
BY
Angus & Mon
ATTORNEYS United States Patent Office 3,110,212
Patented Nov. 12, 1963

3,110,212
INSERT
George S. Wing and William R. Dickie, Palos Verdes Estates, Calif., assignors to Hi-Shear Rivet Tool Company, Torrance, Calif., a corporation of California
Filed Mar. 26, 1959, Ser. No. 802,048
1 Claim. (Cl. 85—2.4)

This invention relates to an insert which can be installed in a hole in a body such as a plate or a wall, for example.

An object of this invention is to provide an insert which may be of a relatively harder and tougher material than the body in which it is to be installed, and which can be installed by operations conducted from only one side of the body, if desired.

An additional object is to provide an insert which includes threads by which other objects can be held to the body through the insert. These threads, because of the strength of the insert material which can be used are more rugged than any threads which could be provided by the relatively softer material of the body in which the insert is installed.

An insert according to this invention comprises a cylindrical sleeve having an axis, which sleeve may but need not, be provided with a longitudinal groove that may or may not go all the way through the sleeve wall. The sleeve is further provided with a smooth walled axial bore into which an expander nut is drawn for expanding the insert into firm contact with the wall of the opening in which it is installed.

According to a preferred but optional feature of this invention, the outer surface of the sleeve is serrated.

According to still another preferred but optional embodiment of this invention, the outer surface of the expander nut is provided with a rounded nose for creating an initial axial compression on, and swelling expansion of, the sleeve as the nut is drawn therein, and a cylindrical section for backing up the insert in its expanded condition after the nut is drawn into the insert.

The above and other features of this invention will be fully understood from the following detailed description and the accompanying drawings, of which:

FIG. 1 is a side view, partly in cutaway cross-section, of an expander nut which is part of the insert of this invention;

FIG. 2 is an end view taken at line 2—2 of FIG. 1;

FIG. 3 is a side view, partly in cutaway cross-section, of a sleeve which forms part of the insert of this invention;

FIG. 4 is an end view taken at line 4—4 of FIG. 3;

FIG. 5 is a side view, partly in cross-section, showing an insert according to the invention set in an opening in a body;

FIG. 6 is an end view taken at line 6—6 of FIG. 1;

FIG. 7 is a side elevation, partly in cutaway cross-section, of another embodiment of the nut;

FIG. 8 is a right-hand end view taken at line 8—8 of FIG. 7;

FIG. 9 is a side elevation of still another embodiment of the nut;

FIG. 10 is an end view of an alternate embodiment of a sleeve useable with this invention;

FIG. 11 is a side view taken at line 11—11 of FIG. 10; and

FIG. 12 is an end view of still another embodiment of a sleeve useable with this invention.

An expander nut 10 is shown in FIG. 1 which has a central axis 11 and an axial hole 12 therethrough, the hole being provided with threads 13. The outer surface of the nut has an outwardly-convex rounded nose section 14 adjacent end 15 thereof, and a circular cylindrical section 16 adjacent the rounded nose section. The cylindrical section 16 is terminated by a shoulder 17, which is preferably circumferential, and which has a flat annular face 17a on its side facing toward the nose section.

On the other side of shoulder 17 from the cylindrical section there is a lock section 18. The lock section comprises a slotted tube which is an integral part of the expander nut, and which has its heaviest cross-section (in a plane perpendicular to central axis 11) adjacent to the shoulder 17. The lock section diminishes in outer diameter and in thickness toward end 19 of the nut. Six slots 20 are cut into the end 19 of the nut, thereby creating six lock fingers 21. The nut is most conveniently made by shaping the outer surface, drilling and tapping hole 12, and then making three diametrical saw cuts across end 19, spaced 60° apart. The fingers are thereafter bent inwardly (see FIG. 2), so that when a bolt is threaded through hole 12, the lock fingers must be spread apart. Then spring-back forces in the fingers tend to lock the bolt in the nut.

A sleeve 22 (see FIGS. 3 and 4) which forms the other part of the insert, is generally cylindrical, and has a smooth-walled circular cylindrical bore 23 therethrough. Chamfers 24 and 25 are provided at opposite ends of the sleeve.

The outer surface of sleeve 22 is serrated by a helical thread 26. It will be understood that serrations other than helical could be used, such as circumferential ring-grooves, or any other desired configuration, the term "serrations" being used in the broad sense of a plurality of non-longitudinal ridges. However, the helical thread shown has been found to be easy to manufacture, and effective in operation. In addition, as will later be shown, a sleeve having an exterior helical thread can be expeditiously removed from a hole in which it is set, if desired.

The shape of the illustrated serrations is of some advantage in this device. As shown, the serrations (threads in FIG. 3) have peak sections 28, and void sections 27 between the peak sections. The volume of the void sections should be greater than that of the peak sections in order that wall material displaced by the peak sections as they are forced into the wall of an opening in which the sleeve is installed can have ample space into which to flow.

If sufficient void volume is not provided to receive the displaced material, then the insert cannot be installed without substantially deforming the body into which it fits. This would tend to crack a brittle body, and would also require a large force for setting the insert. On the other hand, a substantially equal volume of peak section and void section is not entirely satisfactory, because the wall material displaced by the peak sections tends to flow into each void in two waves, one at each shoulder of the groove formed by adjacent peak sections. These waves are ahead of the rest of the displaced material, so that by the time they reach the bottom of a V-shaped groove, for example, large forces would be needed to force the rest of the displaced material into what void remains in the center. Therefore, a substantially greater void volume than crest volume is desirable.

One way to construct a suitable serration arrangement is to provide a V-shaped groove with void section volumes substantially equal to the peak section volumes, but to make the void sections much deeper than the intended penetration of the peak sections into the wall of the body. This, of course, gives ample room for the displaced material, but it also reduces the cross-section of the sleeve wall. Then, to have a sleeve of given strength, the expander nut and threaded bore 12 would have to be smaller. When installed in a hole of a given size, an insert with such a thread and a sleeve of a given wall thickness could not receive a threaded object with as large a diameter as the insert shown in the drawings.

A preferable construction is to provide a substantially flat bottom 29 extending between each pair of peak portions, the bottom being axially wide enough that the void volume is substantially greater than the peak volume. Then the cross-sectional area of the sleeve is maintained at a maximum, and an optimally-sized expander nut can be used for receiving a large-diameter threaded body. It has been found that forces needed for setting such an insert are significantly less than for setting an insert wherein the peak and void volumes are relatively equal. While a plain V-shaped thread inherently has a greater void volume than peak volume and will work in this insert, it is preferable, though not necessary, to increase the void to peak volume ratio beyond that of a single, deep groove, and the flat bottom has been found to be an advantageous way to accomplish this result.

A longitudinal slot 32 extends from end to end of the sleeve in FIG. 3.

Still another embodiment of expander nut is shown in FIG. 7. An expander nut 50 has a central axis 51 and an axial hole 52 therethrough, this bore being provided with internal threads 53. The bore opens out at a first end 54 of the nut, and preferably extends all the way through the nut.

The nut has an outer surface which begins at end 54 with a nose section 55 which is a convex surface of revolution which increases in diameter as it extends away from end 54, the same as nose section 14.

A substantially circular cylindrical section 56 is contiguous to nose section 55 on the opposite side thereof from end 54. The diameter of portion 56 is greater than the unexpanded diameter of the bore in the sleeve in which it is to be set.

Cylindrical portion 56 terminates at a shoulder 57 which is preferably circumferential and has a ring-shaped face 58 facing towards the nose portion.

On the other side of shoulder 57 from end 54 there is a lock section 59 which differs from the lock section 18 on the nut of FIG. 1, in that it is not slotted, but instead is continuous. As can be seen from FIGS. 7 and 8, the axial hole is threaded all the way through the nut, and the lock section instead of being round like the nose section and cylindrical section has, after the threads have been tapped, been placed in an arbor and pressed out of shape so that it assumes a generally elliptical shape. This is a non-circular shape which will round out when a screw or other threaded object is threaded therein. The restoring forces of the lock section thereby tend to retain and lock a threaded object in the hole.

The lock section has, in cross-section normal to the axis, a major axis 60 and a minor axis 61. It will be seen that the minor axis is smaller than the diameter of the threaded section so that the bolt will tend to round it out.

In FIG. 9 there is shown a nut 65 which has the same general configuration as the nut in FIG. 8, except that its nose section 66, while still a surface of revolution, is not outwardly convex, but instead is frusto-conical.

In FIG. 10 there is shown the presently preferred embodiment of sleeve 70 for use with the nuts of FIGS. 1, 7, and 9. This sleeve is provided with an internal bore 71 which is preferably circularly cylindrical. The interior wall is smooth. The outer surface of the sleeve is provided with serrations 72 which are preferably circumferential, individual, non-interconecting grooves, as shown. As can be seen from FIG. 11, these grooves have peak sections 73 and void sections 74. The peaks are separated by flat bottoms 75, and this creates a situation in which comparatively shallow serrations have a significantly greater void volume than crest volume, the same as in the nut shown in FIG. 1.

In addition, sleeve 70 is provided with three longitudinal grooves 76, 77, 78. These grooves are V-shaped and extend a substantial distance into the outer surface of the sleeve, below the flat bottoms of the serrations. They will ordinarily all be made substantially equal in depth. It is to be understood that more or less than three of these longitudinal grooves may be provided, but it has been found that three is the best number.

In FIG. 12 there is shown a variation of the sleeve of FIG. 10 in which a sleeve 80 has an internal bore 81 and serartions 82 which correspond to serrations 72 of sleeve 70, but instead of the three identical longitudinal grooves provided in FIG. 10, the sleeve of FIG. 12 is provided with two identical longitudinal grooves 83, 84 which do not cut all the way through the sleeve, and a third groove 85 which is slotted all the way through the sleeve wall.

The insert of FIG. 5, comprising the nut of FIG. 1 and sleeve of FIG. 3, is installed in the following manner. The sleeve is first slipped over a mandrel and the projecting end of the mandrel is threaded into the expander nut, with the rounded nose section of the nut facing the sleeve. The outer diameter of the thread peaks is selected so as to be equal to or less than the diameter of the hole in which the insert is to be installed. The insert comprising the expander nut and the sleeve is placed in the hole with the sleeve at the axial location where it is to be set. The nose piece of a puller is then pressed against the end of the sleeve which faces the installer, and the mandrel is pulled in opposition to the nose piece so as to draw the expander nut into the sleeve. The nose piece of the puller and the expander nut thereby exert a compressive force on the sleeve, and the expander nut, because of its shape expands the insert into close fitting relationship with the wall. Thus drawing action by the puller should be continued until the shoulder 17 bears against the back end of the sleeve, at which time the cylindrical section 16 is inside the bore 23 of the sleeve, where it is in close fitting contact with the wall thereof, and backs up the sleeve in its expanded condition.

The angle made with the central axis 11 by a line tangent to the rounded nose section varies along the nose portion. This angle is greater adjacent to face 15 than it is adjacent to cylindrical section 16. Accordingly, a portion of the rounded nose section near to face 15 exerts a greater axial component, and a lesser lateral component force on the insert than a portion of the nose section closer to the cylindrical section 16. This is of consequence in the setting of this insert, because it is desired to swell the sleeve as the nose portion 14 is initially drawn up into it. The greater axial force component adjacent face 15 maintains the compressive force, while the portion of the rounded nose nearer the cylindrical section exerts a considerable lateral force on the sleeve. After the nose section passes a given axial point in the sleeve, the cylindrical section engages that point and backs up the insert in its expanded condition, and holds it installed.

When the slot 32 is provided, there is no sleeve structure to bite into the wall at the slot. The two edges of the slot bite into the wall, leaving the portion of the wall between them substantially undisturbed. This portion of the wall acts as a key which prevents the sleeve from being easily unthreaded from the body. By exerting sufficient torque on the sleeve, the threads on the sleeve can be caused to cut through this key, and as soon as this is done, the insert can be unthreaded from the body with relative ease. This insert is therefore held from being unthreaded by ordinary torques, but can be taken out by torques strong enough to cut the key formed in the wall. This removal feature results from using a helical thread. For such a purpose, it is preferable to first cut the helical thread on the cylindrical surface, and then cut the slot in the cylinder to form the sleeve as shown. The sleeve is substantially a circular cylindrical structure, less the material removed to form the slot. When circular circumferential grooves or knurling are used for the external serrations of the sleeve, the advantages of the slot in providing a torque-resistant key do not exist, but even without this feature, the structure provides an effective insert for attaching objects to a body.

In FIG. 5, a bolt 30 is shown threaded into the installed insert. It will be seen that the fingers 21 have been sprung out by the bolt, and that the fingers will therefore exert a spring-back force against the bolt to keep it from being easily turned out. This bolt is shown holding a plate 31 to a body 33 in which the insert has been installed.

Cross-sections of the sleeve lying in planes normal to the central axis of the sleeve, such as axis 22a, are uniform, substantially from end to end of the nut. The exceptions to the uniformity are chamfers of the ends of the bores, such as chamfers 24 and 25 in bore 23, but these extend for only a minor portion of the sleeve length. Of course, when exterior threads are provided on the sleeve, aligned cross-sections will differ in the position where the thread intersects the cross-section plane, but this is still a uniform cross-section in the sense of substantial equality of cross-section area and general configuration.

A desirable set of dimensions for the insert of FIG. 5 is given by the following table.

Expander nut 10:
  Outer diameter of shoulder 17: 0.567–0.570 in.
  From face 15 to face 17a: 0.312 in.
  Outer diameter of cylindrical section 16: 0.467–0.471 in.
  Smallest diameter of nose section 14: 0.400–0.405 in.
  Threads 13: ⅜–24 UNF 3B.
  Radius of nose section 14: 0.100 in.
  Chamfer at face 17: 90° included angle.
  Suggested material: 431 Stainless Steel.
Sleeve 22:
  Peak diameter: 0.574–0.577 in.
  Width of thread bottom 29: 0.010–0.015 in.
  Angle between thread shoulders: 90°.
  Sleeve length: 0.312 in.
  Threads per inch: 22.
  Inside diameter of bore 23: 0.447–0.451 in.
  Chamfers 24 and 25: 90° included angle, greatest chamfer diameters at ends of sleeve: 4.490 in.
  Root diameter of threads (at bottom 29): 0.540–0.543 in.
  Suggested material: 4130 Steel.

The reactions of the nuts of FIGS. 7 and 9 with the sleeve of FIG. 4 are substantially the same as the reaction of the nut of FIG. 1. The nut of FIG. 9 will not, of course, exert the same initial swelling action on the sleeve as the nuts of FIGS. 1 and 7, because it lacks the blunt end to its nose section. However, it does exert an ample compressing and expanding action for many applications. It will also be understood that the lock section of the nut of FIG. 1 could be used on the nut of FIG. 9 instead of the lock section shown therein.

Any of the nuts of FIGS. 1, 7, and 9 can be used with the sleeves of FIGS. 10 or 12. With respect to the use of the nut of FIG. 7 with the sleeve of FIG. 10, the installation is conducted as follows: The sleeve 70 is placed over a mandrel, and the nut 50 is threaded onto the mandrel, and the sleeve is then positioned longitudinally in the wall of the hole in which it is to be applied. Then, the sleeve is placed in compression between a portion of the setting tool and the nut by drawing on the mandrel and pressing the tool against the sleeve. This causes an initial compression of the sleeve to fill the hole, and thereafter the cylindrical portion of the nut is drawn into the expanded bore in the sleeve.

At some time during the expansion, one of the longitudinal grooves 76, 77, or 78, will have become the weaker of the grooves and the sleeve will have fractured at that groove. This of course will relieve the stresses on the others of the grooves, and then the groove which fractures will act in the same manner as the slot 32 in the sleeve of FIG. 3. An additional advantage of using the sleeve of FIG. 10 is that in the event the insert must later be removed, the sleeve may conveniently be bent inwardly with a pick, because the two unfractured longitudinal grooves provide a weakened section at which the sleeve can be conveniently bent. The sleeve can thereby be withdrawn conveniently in pieces, if desired.

The same situation applies with respect to the sleeve of FIG. 12, except that the slot in the sleeve is initially provided for by the third groove 85.

The object of the nut is to expand the sleeve substantially cylindrically. When an axial groove is provided, the expansion is apt to be somewhat non-symmetrical after the sleeve splits longitudinally (or if it is originally slit, the entire expansion will be), but its cross-section after setting will be substantially uniform along the portion of its length which is in contact with the cylindrical portions (16 and 56) of the nut. Furthermore, there will be a substantial absence of flaring at the sleeve ends. An advantage of the non-flaring feature is that, because flaring is not required for setting the insert in the sense that a rivet is flared, the wall of the sleeve can be made thick and strong, thereby to provide a rugged and reliable insert.

The inserts of this invention can conveniently be set in aluminum, copper, iron or other desired materials which are enough softer than the sleeve material so that the sleeve can bite into the wall of the body opening.

This application is a continuation-in-part of applicants' co-pending application, Serial No. 726,865, filed April 7, 1958, entitled "Insert," now abandoned.

This invention is not to be limited by the embodiments shown in the drawings and described in the description, which are given by way of example and not of limitation, but only in accordance with the scope of the appended claim.

We claim:

An insert for installation in an opening defined by a substantially circularly cylindrical wall comprising: a sleeve and a nut for expanding the sleeve and for being retained in said sleeve to provide threads for attachment of threaded objects to said insert, said sleeve having an axis, an outer surface, and a substantially circularly cylindrical axial bore extending through the sleeve, external serrations on the outside of the sleeve, said serrations extending non-parallel to the central axis of the sleeve, the cross-sections of the sleeve lying in planes normal to the axis being uniform substantially from end to end of the sleeve, the nut having an axis, a first end, a threaded axial hole opening at said first end of the nut, and an outer surface which includes a rounded nose portion whose section is substantially circular in planes which lie normal to the axis of the nut, the diameter of the nose portion increasing away from the first end of the nut, and a substantially circularly cylindrical section lying contiguous to and merging smoothly with the nose portion at the opposite side thereof from the first end of the nut, said nut including an exterior shoulder having a radial dimension greater than the diameter of the cylindrical section, said shoulder being spaced from the first end of the nut by a distance which is at least as great as the length of the sleeve bore, the shoulder acting to limit the distance the nut can be pulled into the sleeve, said nut including lock means at a second end of the nut, said second end being at the opposite side of the nut from the first end, the diameter of the cylindrical section being greater than the diameter of the bore in the sleeve, the axial length of the nose section being substantially less than the axial length of the cylindrical section, and the combined axial length of the nose section and cylindrical section being at least as great as the length of the bore in the sleeve, whereby with the sleeve positioned in said opening, the nut can be drawn, its first end first, into the bore of the sleeve, so that the nose portion expands the sleeve, the cylindrical section of the nut holds the sleeve expanded, and the spring-back of the sleeve material upon the cylindrical section serves to hold the nut in the sleeve, the sleeve in its expanded condition being without substantial flare at either end, means extending longitudinally of said sleeve to resist rotation of said sleeve when expanded in an opening, and being uniformly expanded over the entire length which is in contact with the cylindrical section of the nut.

References Cited in the file of this patent

UNITED STATES PATENTS

| | | |
|---|---|---|
| 332,540 | Law | Dec. 15, 1885 |
| 1,621,598 | Phillips | Mar. 22, 1927 |
| 2,031,325 | Meyer | Feb. 18, 1936 |
| 2,120,577 | Schulte | June 14, 1938 |
| 2,154,012 | Rhodes | Apr. 11, 1939 |
| 2,252,316 | Gelpcke | Aug. 12, 1941 |
| 2,384,321 | Lees | Sept. 4, 1945 |
| 2,584,133 | Koochembere | Feb. 5, 1952 |
| 2,959,999 | Wing | Nov. 15, 1960 |

FOREIGN PATENTS

| | | |
|---|---|---|
| 137,806 | Great Britain | Sept. 9, 1920 |

UNITED STATES PATENT OFFICE
CERTIFICATE OF CORRECTION

Patent No. 3,110,212                          November 12, 1963

George S. Wing et al.

It is hereby certified that error appears in the above numbered patent requiring correction and that the said Letters Patent should read as corrected below.

Column 4, line 31, for "Thus" read -- This --; column 5, line 42, for "4.490" read -- 0.490 --.

Signed and sealed this 28th day of April 1964.

(SEAL)
Attest:

ERNEST W. SWIDER                          EDWARD J. BRENNER
Attesting Officer                            Commissioner of Patents